United States Patent [19]
Stephens

[11] 3,983,072
[45] Sept. 28, 1976

[54] EXHAUST CATALYST

[75] Inventor: Ruth E. Stephens, Royal Oak, Mich.

[73] Assignee: Ethyl Corporation, Richmond, Va.

[22] Filed: Apr. 16, 1973

[21] Appl. No.: 351,187

[52] U.S. Cl. ............................ 252/460; 252/462;
    252/466 PT; 252/471; 423/213.2
[51] Int. Cl.$^2$ .................. B01J 29/12; B01J 29/22;
    B01J 23/62; B01J 23/82
[58] Field of Search ............ 252/460, 462, 466 PT,
    252/471

[56] References Cited
UNITED STATES PATENTS

| | | | |
|---|---|---|---|
| 2,742,437 | 4/1956 | Houdry | 252/471 X |
| 3,295,918 | 1/1967 | Briggs et al. | 252/466 PT X |
| 3,498,927 | 3/1970 | Stiles | 252/462 X |
| 3,524,721 | 8/1970 | Stephens | 252/462 X |
| 3,545,917 | 12/1970 | Stephens | 252/462 X |
| 3,764,564 | 10/1973 | Maselli | 252/471 X |
| 3,770,659 | 11/1973 | Cosgrove et al. | 252/466 PT X |
| 3,776,859 | 12/1973 | Simpson | 252/462 |

*Primary Examiner*—Paul F. Shaver
*Attorney, Agent, or Firm*—Donald L. Johnson; Robert A. Linn; Joseph D. Odenweller

[57] ABSTRACT

Engine exhaust gas is rendered less noxious by contact with a catalyst consisting essentially of manganese oxide and palladium on a suitable support such as alumina. Optionally, the support may be precoated with a rare earth metal oxide to improve catalyst hardness.

8 Claims, No Drawings

EXHAUST CATALYST

BACKGROUND

In recent years extensive research has been devoted to the alleviation of air pollution in many metropolitan areas. Part of this effort has been directed to methods of reducing the hydrocarbon, carbon monoxide and nitrogen oxide content of the exhaust gas of internal combustion engines. Various catalytic converter systems have been proposed to accomplish this. With such systems, the exhaust gases are passed through a catalytic bed whereupon the noxious materials are converted to an inactive form.

Manganese-containing catalysts have been proposed for use in the above catalytic converters. In U.S. Pat. No. 3,207,704, an alumina supported manganese catalyst is disclosed which may optionally be promoted with lead, copper, chromium, barium, titanium, cerium or tin. In U.S. Pat. No. 3,024,593, a list of ten suitable catalytic metals is disclosed which includes individually manganese and palladium. The only mixture actually disclosed is copper-chromium. U.S. Pat. No. 2,071,119 has a similar disclosure and contains a list of catalytically active metals which includes manganese and palladium, but does not disclose the combination of manganese and palladium. West German Pat. No. 1,442,743 discloses alumina catalysts treated with solutions of manganese, palladium and/or silver, optionally with nickel and/or cobalt and/or iron. In West German Pat. No. 1,268,907, a catalyst is disclosed containing copper oxide, manganese oxide, chromia and palladium on an alumina, silica-alumina or clay support.

Certain of the catalysts described herein are on a support which is precoated with a rare earth metal oxide. Catalysts containing rare earth metal oxides are disclosed in U.S. Pat. Nos. 3,291,564; 3,483,138; 3,545,917; 3,226,340; 3,453,333; 3,395,004; 3,284,370; 3,153,635; 2,945,057; 2,152,908; 2,148,129; 2,129,733, and British Pat. No. 1,231,276.

SUMMARY OF THE INVENTION

According to the present invention, an effective catalyst is provided consisting essentially of manganese oxide and palladium on a suitable catalyst support. The support may optionally be precoated with a rare earth metal oxide, alone or together with silica and/or alumina. Engine exhaust gas is rendered less noxious by contact with the catalyst with or without addition of supplemental air.

DESCRIPTION OF THE PREFERRED EMBODIMENTS

A preferred embodiment of this invention is an exhaust gas catalyst consisting essentially of about 0.1–20 weight per cent manganese in an oxide form and 0.005–0.3 weight per cent palladium on a catalyst support. The percentages are based on the final catalyst weight.

The catalysts are readily prepared by immersing the support into a solution of a manganese salt which is decomposable to an oxide form and a palladium salt. Both materials may be applied to the support at the same time or separately. Multiple impregnations can be employed with a drying and/or calcining stage between impregnations.

Suitable manganese salts which are thermally decomposable to an oxide form are manganese nitrate and manganese acetate. Suitable palladium salts for use in the impregnation are palladium chloride and palladium nitrate. It is preferred to use an aqueous solution which is substantially saturated with the manganese salt. More dilute palladium solutions may be employed since only minor amounts of palladium are required in the catalyst.

After the catalyst is impregnated it is slowly heated to about 600°–700°C. to drive off water, decompose the manganese salt and activate the catalyst.

The support may be any of the many materials conventionally used as catalyst supports such as alumina, silica, silica-alumina, magnesia, zirconia, magnesia-alumina, silica-magnesia-alumina, marble chips, cordierite, mullite, alumina-coated wire mesh, ceramics such as the high surface honeycomb monolithic ceramics described in U.S. Pat. No. 3,444,925, and the like. The preferred support is alumina which may contain up to about 10 per cent silica, but preferably less than 5 per cent.

The attrition resistance of the catalysts may be improved by treating or precoating the support with a rare earth metal oxide. The preferred rare earth metal oxides are lanthanum oxide, neodymium oxide, praseodymium oxide, or mixtures thereof. The rare earth metal oxide precoat serves to prevent crystallization of the support and resultant attrition. Crystallization of the supports is sometimes increased by impregnating the supports with catalytic metals such as manganese. This is inhibited by the rare earth metal oxide precoat.

The rare earth metal oxide precoat is applied by immersing the support in a solution of a rare earth metal salt which is thermally decomposable to an oxide form. Good precoats are obtained using an aqueous solution of rare earth metal nitrate or acetate such as lanthanum nitrate, lanthanum acetate, neodymium nitrate, neodymium acetate, praseodymium nitrate, praseodymium acetate, cerium nitrate, and the like. Following impregnation, the support is dried and calcined to about 600°–700°C. to decompose the rare earth metal salt to an oxide form.

The amount of rare earth metal oxide applied as a precoat should be sufficient to improve the attrition resistance of the catalyst. A useful concentration is from about 0.1 to 5 weight per cent rare earth metal oxide based on the weight of the precoated support.

In a further preferred embodiment the support is precoated with a mixture of rare earth metal oxide and alumina. This is readily accomplished by immersing the support (e.g., alumina) in a solution of a rare earth metal salt and an aluminum salt which are decomposable to an oxide form. The rare earth metal salts are suitably nitrates or acetates. The aluminum salts can likewise be nitrates or acetates.

The amount of aluminum salt used in the precoat bath is preferably enough to provide an atom ratio of about 5.7–25 aluminum atoms per atom of rare earth metal. A more preferred range is from 8–20 aluminum atoms per atom of rate earth metal. Following the impregnation the catalyst support is dried and calcined to about 600°–700°C. to decompose the rare earth metal and aluminum salts to oxides. If desired, multiple precoats can be applied with calcining steps in between.

In another preferred embodiment the catalyst support is given a precoat of a mixture of rare earth metal oxides and silica to render it more attrition resistant. This can be accomplished by immersing the support in an aqueous solution of a rare earth metal nitrate or acetate containing a sol of finely-divided silica. Following the impregnation the support is dried and calcined to about 600°–700°C. to provide a support of increased attrition resistance. Multiple immersions can be used with a calcining stage in between. The amount of silica in the precoat bath is preferably adequate to supply about 0.1–2 atoms of silicon per atom of rare earth metal in the precoat. A preferred range is about 0.6–1.4 atoms of silicon per atom of rare earth metal, and a most preferred silicon:rare earth metal atom ratio is 1:1.

In a still further preferred embodiment the catalyst support is precoated with a mixture of rare earth metal oxide, silica and alumina to provide an exceptionally attrition resistant support. This is readily accomplished by immersing the support in an impregnation bath containing a rare earth metal salt, an aluminum salt, both decomposable to an oxide form, and a slurry of very finely-divided silica. The amount of these materials in the precoat bath is preferably adjusted to provide an atom ratio of rare earth metal to silicon to aluminum of about 1:0.1–2:2–10, and more preferably, an atom ratio of 1:0.6–1.4:2–10. Following the impregnation the support is dried and calcined to about 600°–700°C. Multiple impregnations may be employed to obtain a heavier precoat. The materials used in the precoat bath are the same as previously described.

The following examples serve to illustrate the manner in which the catalyst can be prepared.

EXAMPLE 1

An impregnation solution was prepared by mixing 368 grams manganese acetate hydrate, 360 ml of commercial 50 per cent manganese nitrate solution and sufficient water to make 1300 ml. One-half of this solution was poured into a vessel cntaining two liters 5–8 mesh activated alumina (Alcoa F-1). Residual liquid remaining after impregnation was evaporated with hot air blow and the catalyst then dried on a hot plate. The dried catalyst was mixed with the remainder of the impregnation solution and after absorption was complete residual liquid was evaporated as before. The catalyst was dried on a hot plate and then heated slowly to 600°C. in an oven. After 1 hour at 600°C., the catalyst was allowed to cool.

The above procedure was repeated to obtain 4 liters of manganese-impregnated catalyst. This was immersed in an aqueous solution containing 8.4 grams of palladium nitrate and after absorption was substantially complete residual liquid was evaporated by hot air blow and the catalyst dried on a hot plate. It was then immersed in a second aqueous solution containing 8.4 grams of palladium nitrate as before. The dried catalyst was heated slowly to 600°C. and calcined at that temperature for one hour, resulting in an exhaust gas catalyst having excellent activity.

EXAMPLE 2

In an impregnation vessel place 100 grams of an aqueous solution containing 35.5 grams of hydrated aluminum nitrate. To this add 7.2 grams of lanthanum acetate and 1 gram of finely-divided silica powder. Stir for several minutes and then add 200 grams of 5–8 mesh activated alumina. After absorption is complete, evaporate the residual liquid with hot air blow and dry the support. Place the support in an oven and heat slowly to 600°C. and hold at this temperature for 1 hour.

Immerse the dried precoated support in a solution containing 65 grams of 50 per cent commercial manganese nitrate solution and sufficient water to cover the support. After absorption is complete, evaporate residual liquid with hot air blow and dry the catalyst on a hot plate. Immerse the dried catalyst in an aqueous solution containing 0.4 gram of palladium nitrate. After absorption is complete, evaporate the residual liquid, dry the catalyst on a hot plate, and heat slowly to 650°C. and hold at that temperature for one hour to obtain an active supported manganese-palladium catalyst.

EXAMPLE 3

In a mixing vessel place 200 grams of didymium nitrate and 30 grams of finely-divided silica powder. Dilute with 850 ml of water, warm and stir for 3 hours. Take 400 ml of the mixture and add to a separate vessel containing 1 liter of 5–8 mesh alumina. After absorption is complete, evaporate residual liquid with a hot air blow. Heat the support slowly to 600°C. and then cool. Impregnate the support a second time with the remaining 450 ml of solution, dry and heat to 850°C., resulting in a lanthana-silica precoated support.

Take 200 grams of the support and immerse in an aqueous solution containing 55 grams of 50 per cent manganese nitrate solution. Evaporate residual liquid and dry the catalyst on a hot plate. Immerse the catalyst in a second solution containing 55 grams of 50 per cent manganese nitrate solution and dry as before. Immerse the catalyst in an aqueous solution containing 0.8 gram palladium nitrate and after absorption is complete, evaporate the residual liquid with hot air and dry the catalyst on a hot plate. Slowly heat the catalyst in an oven to 600°C. and calcine at that temperature for 2 hours to obtain an active catalyst.

EXAMPLE 4

In an impregnation vessel place 43 grams of lanthanum nitrate hydrate, 300 grams aluminum nitrate hydrate and 300 ml of water. After solution is complete, add 1000 grams of 5–8 mesh activated alumina. Evaporate residual liquid with hot air and heat the support slowly to 600°C. to obtain a lanthana-alumina precoated support.

Immerse the precoated support in an aqueous solution containing 167 grams of manganese nitrate and evaporate residual liquid with hot air as before. Dry the catalyst on a hot plate and heat slowly in an oven to 600°C. Cool and immerse in an aqueous solution containing 5 grams of palladium nitrate. Evaporate residual liquid and dry as before. Heat in an oven to 600°C. and hold for an hour at that temperature to obtain an effective catalyst.

Although the rare earth salt in the above examples was a lanthanum salt, it is understood that other rare earth metal salts can also be used. An especially useful rare earth metal salt is "didymium nitrate" which is a commercial mixture of rare earth metal nitrates which analyzes, on an oxide basis, as 45–46 per cent lanthanum oxide, 32–33 per cent neodymium oxide, 9–10 per cent praseodymium oxide, 5–6 per cent samarium oxide, 3–4 per cent gadolinium oxide, and 1–2 per cent cerium oxide.

The catalysts are very effective in lowering the amount of noxious constituents in engine exhaust gas. The catalysts are also exceptionally resistant to the detrimental effects generally attributed to the use of leaded gasoline. Engine tests were conducted which demonstrate these properties. The first test was a single cylinder engine test. A 36 CID single cylinder engine was operated on gasoline containing 12 ml tetraethyllead per gallon as a commercial antiknock fluid. This is much higher than normally contained in gasoline in order to severely test the catalyst. The exhaust gas was passed through dual parallel 42 cubic inch catalytic converters. In one converter was placed a portion of the catalyst prepared in Example 1. The engine was operated on a cycle of idle (850 rpm) 50 seconds — part throttle (1340 rpm) 130 seconds. Hydrocarbon and carbon monoxide measurements were periodically made during past throttle operation before and after the catalytic converter. The results of this test are shown in the following table.

TABLE 1

| Test Hours | Percent Reduction | |
|---|---|---|
| | HC | CO |
| 2.6 | 85.3 | 96.7 |
| 23.1 | 85.0 | 94.9 |
| 48.8 | 70.9 | 89.4 |
| 70.4 | 68.6 | 88.4 |

No catalyst was lost during the test. This test showed the catalyst to be exceptionally active and highly resistant to the effects of lead. Based on this test, further tests were carried out on a full-size 1970 American passenger car equipped with a 318 CID V-8 engine. A catalytic converter was installed in the exhaust gas line and 12.58 pounds of a catalyst made according to Example 1 was placed in the converter. The car was operated on commercial gasoline containing 2 grams of lead per gallon as commercial antiknock fluid and 0.003 weight per cent sulfur. The car had accumulated 59,165 miles prior to the test. No maintenance was performed on the car during the test other than regular oil changes. At 69 test miles, 0.58 pound of fresh catalyst was added to the converter to compensate for bed packing. Again, at 1,853 miles, 0.31 pound of the same catalyst was added due to further packing. No further catalyst was added. The engine exhaust emissions were measured following the 1975 Federal CVS procedure. Measurements were made prior to installing the catalyst and then periodically during the course of the test. The car was operated on a suburban-type driving schedule. The following table shows the results obtained.

TABLE 2

| | 1975 CVS EMISSIONS | | | | |
|---|---|---|---|---|---|
| | Hydrocarbon | | Carbon Monoxide | | $NO_x$ |
| | g/mi | % red. | g/mi | % red. | g/mi |
| 1975 Federal Standard | .41 | — | 3.4 | — | 3.0 |
| Initial (no catalyst) | 1.85 | — | 14.79 | — | 4.62 |
| Miles on Test | | | | | |
| Start test (catalyst) | 0.24 | 87 | 1.9 | 87.2 | 5.46 |
| 2090 miles | 0.44 | 76.2 | 2.05 | 86.1 | 4.27 |
| 4119 miles | 0.41 | 77.8 | 2.66 | 82.0 | 5.16 |
| 6288 miles | 0.50 | 73.0 | 3.17 | 78.6 | 5.07 |
| 6299 miles | 0.49 | 73.5 | 2.77 | 81.3 | 4.70 |
| Test over (no catalyst) | 2.45 | — | 15.68 | — | 5.38 |

Following the test the catalyst was removed and weighed. There was 13.46 pounds of catalyst, which is about identical to the amount used in the test. As the above test results show, the catalyst brings a 1970 American automobile with 59,165 odometer miles very close to meeting the 1975 Federal standards for hydrocarbon and carbon monoxide. Since the catalyst was operated under oxidizing conditions, no benefit was expected in $NO_x$ emission.

I claim:
1. A catalyst especially adapted for use over an extended period in lowering the hydrocarbon and carbon monoxide content of exhaust gas emitted by an internal combustion engine operating on gasoline containing a tetraalkyl lead antiknock agent, said catalyst consisting essentially of about 0.1–20 weight per cent manganese in an oxide form and 0.005–0.3 weight per cent palladium on a catalyst support.
2. A catalyst of claim 1 wherein said support is a high surface monolithic ceramic.
3. A catalyst of claim 1 wherein said support is an alumina.
4. A catalyst of claim 3 wherein said alumina support is precoated with a rare earth metal oxide.
5. A catalyst of claim 4 wherein said rare earth metal oxide consists mainly of an oxide selected from lanthanum oxide, praseodymium oxide and neodymium oxides, and mixtures thereof.
6. A catalyst of claim 5 containing 1 to 20 weight per cent manganese in an oxide form and from 0.005 to 0.03 weight per cent palladium.
7. A catalyst of claim 3 wherein said support is precoated with a mixture of rare earth metal oxide and alumina.
8. A catalyst of claim 7 wherein the atom ratio of said rare earth metal to aluminum in said precoat is 1:8–20.

* * * * *